May 17, 1955     A. GUMER     2,708,414
APPARATUS FOR COAXIALLY DISPENSING DIFFERENT
TYPES OF SEMI-SOLID MATERIAL
Filed Nov. 17, 1952     2 Sheets-Sheet 1
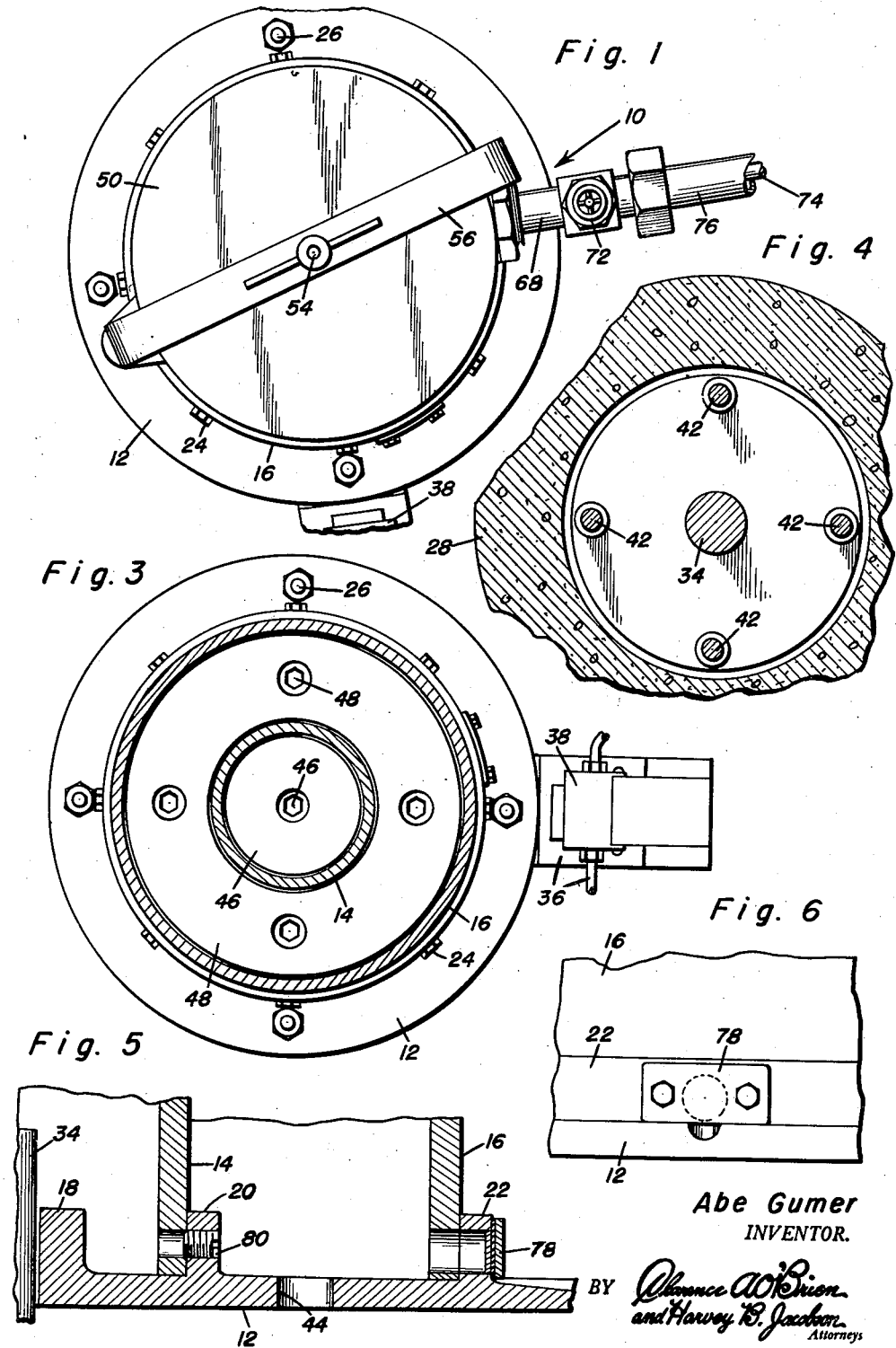
Abe Gumer
INVENTOR.

May 17, 1955
A. GUMER
2,708,414
APPARATUS FOR COAXIALLY DISPENSING DIFFERENT
TYPES OF SEMI-SOLID MATERIAL
Filed Nov. 17, 1952
2 Sheets-Sheet 2
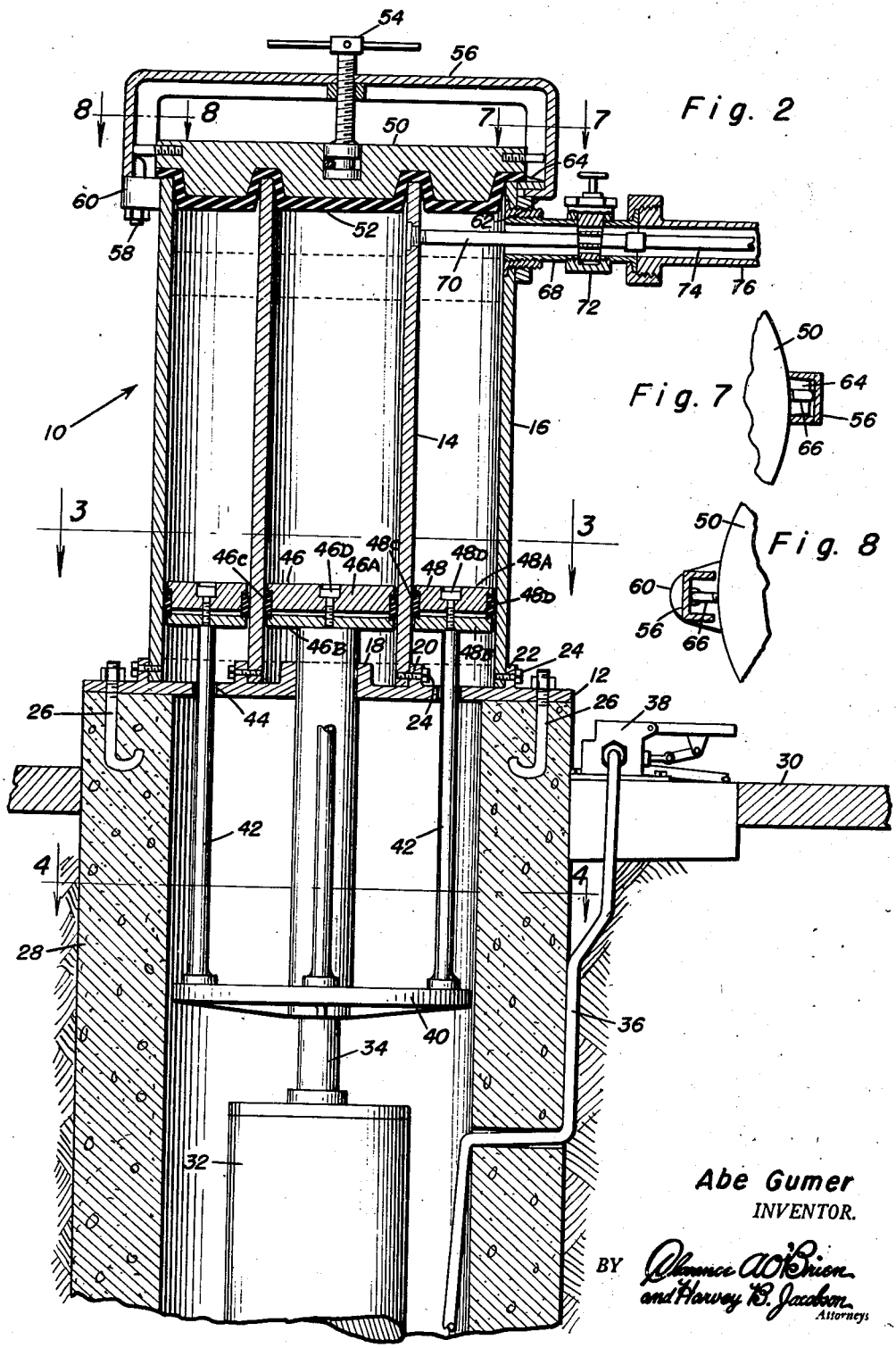
Abe Gumer
INVENTOR.

United States Patent Office 2,708,414
Patented May 17, 1955

2,708,414

APPARATUS FOR COAXIALLY DISPENSING DIFFERENT TYPES OF SEMI-SOLID MATERIAL

Abe Gumer, Louisville, Ky.

Application November 17, 1952, Serial No. 320,914

6 Claims. (Cl. 107—1)

This invention relates to new and useful improvements in structural refinements in dispensers, and the principal object of the invention is to provide means for coaxially dispensing two different types of semi-solid material.

Particularly, the invention is intended for use in the meat packing industry in the art of stuffing sausages, bologna, or the like, an important feature of the invention residing in the provision of means for simultaneously stuffing two different types of material, such as for example, meat and cheese into a single casing so that the cheese is in the form of a core disposed axially in a surrounding jacket of meat, or vice versa, and the entire product is suitably encased in a conventional casing.

Some of the advantages of the invention reside in its simplicity of construction, in its efficient operation, in its adaptability to instantaneous control, in its ability to be readily taken apart for purposes of cleaning, and in its adaptability to economical manufacture.

With the above more important objects and features in view and such other objects and features as may become apparent as this specification proceeds, the invention consists essentially of the arrangement and the construction of parts as illustrated in the accompanying drawings, in which:

Figure 1 is a top plan view of the invention;

Figure 2 is a vertical sectional view thereof;

Figure 3 is a transverse sectional view, taken substantially in the plane of the line 3—3 in Figure 2;

Figure 4 is a transverse sectional view, taken substantially in the plane of the line 4—4 in Figure 2;

Figure 5 is a fragmentary sectional detail of the inner and outer cylinders and the base plate thereof;

Figure 6 is a fragmentary elevational view of the subject shown in Figure 5;

Figure 7 is a sectional detail, taken substantially in the plane of the line 7—7 in Figure 2; and Figure 8 is a sectional detail, taken substantially in the plane of the line 8—8 in Figure 2.

Like characters of reference are employed to designate like parts in the specification and throughout the several views.

Referring now to the accompanying drawings in detail, the invention consists of a dispensing apparatus which is designated generally by the reference character 10 and embodies in its construction a base plate 12 carrying an inner cylinder 14 and an outer cylinder 16 which surrounds the inner cylinder in spaced coaxial relation.

The base plate 12 is provided on its upper surface with a central hub 18 and with annular flanges 20, 22, the cylinders 14, 16 being secured to the respective flanges 20, 22 by suitable screws 24.

The base plate 12 is secured by a plurality of anchor bolts 26 to a tubular housing 28 which may be embedded in the ground under the floor 30 and the housing 28 accommodates a vertical compressed air or hydraulic cylinder 32 having a piston rod in the form of a shaft 34.

The cylinder 32 is actuated by compressed air or oil which is delivered thereto by means of a line 36, the latter communicating with a suitable control valve 38 at the floor level 30.

A plate 40 is secured to an intermediate portion of the shaft 34 and carries a plurality of vertical rods 42 which extend freely and slidably through apertures 44 provided in the base plate 12. Similarly, the shaft 34 extends slidably and freely through the aforementioned hub 18 of the base plate.

An inner piston 46 is slidable in the inner cylinder 14 and is in abutment with the upper end of the shaft 34 so that it may be pushed upwardly by that shaft in the cylinder. Similarly, an annular outer piston 48 is slidable in the outer cylinder 16 and is in abutment with the upper ends of the rods 42 so that it may be pushed upwardly thereby.

The inner piston 46 consists of two sections 46A, 46B which clampingly engage a resilient piston ring 46C upon tightening of a clamp or screw 46D, so that the piston ring may be frictionally engaged with the inner surface of the cylinder 14.

Similarly, the outer piston 48 consists of two sections 48A, 48B which are connected together by a plurality of clamping screws 48D whereby to urge an outer resilient piston ring 48D with the inner surface of the outer cylinder 16 and an inner resilient piston ring 48C in frictional engagement with the outer surface of the inner cylinder 14.

It is to be noted that when the cylinder 32 is energized so as to slide the shaft 34 and the rods 42 upwardly, the pistons 46 and 48 are simultaneously slid upwardly into respective cylinders 14, 16. On the other hand, when the cylinder 32 is de-energized, the pistons 46, 48, the shaft 34 and the rods 42 automatically descend under the influence of gravity.

The device is provided at the upper end thereof with a cover plate 50 having a liner or gasket 52 at the underside thereof so as to simultaneously close the upper ends of the cylinders 14, 16, and the cover plate 50 is clamped in position by means of a clamping screw 54 rotatably journalled in a U-shaped yoke 56.

This yoke straddles the cover plate and is provided at one end thereof with a pin 58 rotatably journalled in an ear 60 at the upper end of the cylinder 16. The other end of the yoke 56 is formed with an inturned hook 62 which engages a lug 64 at the diametrically opposite side of the cylinder 16. A pair of diametrically opposed pins 66 extend from the cover plate 50 into the yoke 56 so as to prevent the cover plate from rotating with respect to the yoke. It will be apparent from the foregoing that after the screw 54 is loosened, the yoke 56 may be swung laterally to a sufficient extent so as to disengage the hook 62 from the lug 64, and to permit the yoke together with the cover plate 50 to be swung laterally about the axis of the pin 58 to effect opening of the cylinders 14, 16.

An outer outlet tube 68 extends laterally from the upper end portion of the outer cylinder 16 while an inner outlet tube 70 extends laterally from the upper end of the cylinder 14. The inner tube 70 is disposed in spaced, coaxial relation in the outer tube 68 and both tubes are connected to a suitable valve assembly 72 which can simultaneously open or close both the tubes 68, 70.

A suitable dispensing nozzle including spaced, coaxial inner and outer nozzle members 74, 76, is connected to the valve 72, for communication with the respective outlet tubes 70, 68 when the valve 72 is open.

It will be understood that when the invention is placed in use and the inner and outer cylinders 14, 16 are filled with two different types of material, energization of the cylinder 32 will cause the respective pistons 46, 48 to travel upwardly in the cylinder 14, 16, thus forcing the two different kinds of material through the respective tubes 70, 68 and through the valve 72 and nozzle members 74, 76 into a conventional casing (not shown), wherein the two different types of material will be coaxially disposed.

For purposes of cleaning, the flange 22 of the outer cylinder 16 is provided with a removable closure plate 78 while a removable plug 80 is provided in the flange 20 of the inner cylinder 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A stuffing machine for coaxially dispensing a plurality of food products comprising a base plate, a plurality of substantially equal length cylinders arranged in spaced concentric relation one within the other and being open at their upper and lower ends, means detachably securing said cylinders at their lower ends to said base plate, said base plate having apertures therethrough opening into the annular space between cylinders and into the lower end of the central cylinder, pistons respectively slidably disposed in the annular space between cylinders and in the central cylinder, piston rods slidably extending through said base plate apertures and fastened to said pistons, means rigidly connecting said rods to one another for simultaneous movement and means for moving said piston rods, coaxially arranged outlet lines opening into the upper side walls of said cylinders and a cover sealingly closing the upper ends of said cylinders whereby upward movement of the pistons coaxially dispenses food products through said outlet lines, and valve means opening and closing said outlet lines.

2. The combination of claim 1, said pistons including means selectively adjusting the frictional engagement of the pistons with the cylinder side walls.

3. The combination of claim 1, said pistons each comprising spaced plates having peripheral side wall grooves, a deformable piston ring seated in each groove, means drawing said spaced plates toward one another to deform said piston rings to increase the frictional engagement of the rings with the cylinder walls.

4. A stuffing machine for coaxially dispensing a plurality of food products comprising a base plate, a plurality of substantially equal length cylinders arranged in spaced concentric relation one within the other and being open at their upper and lower ends, means detachably securing said cylinders at their lower ends to said base plate, said base plate having apertures therethrough opening into the annular space between cylinders and into the lower end of the central cylinder, pistons respectively slidably disposed in the annular space between cylinders and in the central cylinder, piston rods slidably extending through said base plate apertures and fastened to said pistons, means rigidly connecting said rods to one another for simultaneous movement and means for moving said piston rods, coaxially arranged outlet lines opening into the upper side walls of said cylinders and a cover sealingly closing the upper ends of said cylinders whereby upward movement of the pistons coaxially dispenses food products through said outlet lines, and valve means opening and closing said outlet lines, said base plate having concentrically spaced annular flanges extending from the top surface thereof, the lower ends of said cylinders being detachably secured to said flanges.

5. A stuffing machine for coaxially dispensing a plurality of food products comprising a base plate, a plurality of substantially equal length cylinders arranged in spaced concentric relation one within the other and being open at their upper and lower ends, means detachably securing said cylinders at their lower ends to said base plate, said base plate having apertures therethrough opening into the annular space between cylinders and into the lower end of the central cylinder, pistons respectively slidably disposed in the annular space between cylinders and in the central cylinder, piston rods slidably extending through said base plate apertures and fastened to said pistons, means rigidly connecting said rods to one another for simultaneous movement and means for moving said piston rods, coaxially arranged outlet lines opening into the upper side walls of said cylinders and a cover sealingly closing the upper ends of said cylinders whereby upward movement of the pistons coaxially dispenses food products through said outlet lines, and valve means opening and closing said outlet lines, said cover having a plurality of concentrically spaced grooves in the undersurface thereof, the upper ends of said cylinders seating in said grooves.

6. The combination of claim 5, said cover including a cover plate and a yoke straddling said cover plate, means interconnecting said yoke and said cover plate for moving them toward and away from one another, and means releasably securing said yoke to the outermost cylinder.

References Cited in the file of this patent

UNITED STATES PATENTS

| 486,362 | Treadwell | Nov. 15, 1892 |
| 1,513,781 | Yates | Nov. 4, 1924 |
| 1,602,331 | Britton | Oct. 5, 1926 |
| 1,664,337 | Vanderput | Mar. 27, 1928 |
| 2,005,599 | Stricker | June 18, 1935 |
| 2,282,313 | Hershey | May 12, 1942 |
| 2,371,225 | Curry | Mar. 13, 1945 |